(12) United States Patent
Gao et al.

(10) Patent No.: US 11,249,677 B2
(45) Date of Patent: Feb. 15, 2022

(54) METHOD AND APPARATUS FOR ERASING OR WRITING FLASH DATA

(71) Applicant: C-SKY Microsystems Co., Ltd., Hangzhou (CN)

(72) Inventors: Yingjun Gao, Hangzhou (CN); Qijie Tong, Hangzhou (CN); Chunqiang Li, Hangzhou (CN); Han Mao, Hangzhou (CN)

(73) Assignee: C-SKY Microsystems Co., Ltd., Hangzhou (CN)

( * ) Notice: Subject to any disclaimer, the term of this patent is extended or adjusted under 35 U.S.C. 154(b) by 63 days.

(21) Appl. No.: 16/128,486

(22) Filed: Sep. 11, 2018

(65) Prior Publication Data

US 2019/0079700 A1 Mar. 14, 2019

(30) Foreign Application Priority Data

Sep. 11, 2017 (CN) .......................... 201710811896.5

(51) Int. Cl.
*G06F 3/00* (2006.01)
*G06F 3/06* (2006.01)
(Continued)

(52) U.S. Cl.
CPC .......... *G06F 3/0659* (2013.01); *G06F 3/0604* (2013.01); *G06F 3/0619* (2013.01); *G06F 3/0637* (2013.01); *G06F 3/0652* (2013.01); *G06F 3/0679* (2013.01); *G06F 3/0688* (2013.01); *G06F 9/3004* (2013.01); *G06F 9/34* (2013.01)

(58) Field of Classification Search
None
See application file for complete search history.

(56) References Cited

U.S. PATENT DOCUMENTS

| 2007/0118688 A1 | 5/2007 | Lee et al. |
| 2008/0022396 A1 | 1/2008 | Kado |

(Continued)

FOREIGN PATENT DOCUMENTS

| CN | 101625897 A | 1/2010 |
| CN | 101727395 A | 6/2010 |

(Continued)

OTHER PUBLICATIONS

First Chinese Search Report issued in corresponding Chinese Application No. 201710811896.5 dated Jul. 22, 2019 (2 pages).

(Continued)

*Primary Examiner* — Midys Rojas
(74) *Attorney, Agent, or Firm* — Finnegan, Henderson, Farabow, Garrett & Dunner, LLP

(57) ABSTRACT

The present disclosure provides a method and an apparatus for erasing or writing Flash data. The method includes: reading an instruction for erasing or writing the data, the instruction for erasing or writing the data carrying start address information and end address information of a Flash memory where an operation of the instruction is to occur; querying whether the start address information and the end address information are in an address information table including one or more address ranges; and processing the instruction based on a result of the querying.

18 Claims, 5 Drawing Sheets

(51) Int. Cl.
*G06F 9/30* (2018.01)
*G06F 9/34* (2018.01)

(56) References Cited

U.S. PATENT DOCUMENTS

| | | | |
|---|---|---|---|
| 2009/0043969 A1* | 2/2009 | Yoon | G06F 12/1408 711/147 |
| 2014/0258592 A1 | 9/2014 | Rostoker | |
| 2016/0170902 A1 | 6/2016 | Sahita et al. | |
| 2018/0326735 A1* | 11/2018 | Zhang | G06F 21/78 |

FOREIGN PATENT DOCUMENTS

| | | |
|---|---|---|
| CN | 102043734 A | 5/2011 |
| CN | 102043734 A | 5/2011 |
| CN | 102737715 A | 10/2012 |
| CN | 105264513 A | 1/2016 |
| CN | 105279094 A | 1/2016 |
| CN | 107066311 A | 8/2017 |
| CN | 107608905 A | 1/2018 |

OTHER PUBLICATIONS

Supplementary Chinese Search Report issued in corresponding Chinese Application No. 201710811896.5 dated Sep. 29, 2019 (2 pages).
Extended European Search Report and supplementary European Search Report in European Application No. 18853869.8, dated Oct. 20, 2020 (8 pgs).
PCT International Search Report and Written Opinion dated Feb. 20, 2019, issued in corresponding International Application No. PCT/IB2018/001139 (8 pgs.).

* cited by examiner

METHOD AND APPARATUS FOR ERASING OR WRITING FLASH DATA

CROSS-REFERENCE TO RELATED APPLICATION

The present application claims priority to Chinese Patent Application No. 201710811896.5, filed on Sep. 11, 2017, which is incorporated herein by reference in its entirety.

TECHNICAL FIELD

The present disclosure relates to the field of Flash technologies, and in particular, to a method and an apparatus for erasing or writing Flash data.

BACKGROUND

Erasing and writing of Flash data (that is, data stored or intended to be stored in Flash memory) are generally involved in an embedded device, e.g., updating a program on a Flash memory when writing configuration information and log information, system upgrade, or the like.

When Flash data is erased or written, if a program code has a defect, the Flash data might be erased by mistake or written into a Flash location that is not set in advance. This could cause severe problems such as destruction to data stored in the Flash memory and damage to a bootstrap program. In addition, increasingly more devices will be connected to the network along with the rapid development of network technologies. If some malicious programs attack an embedded device intentionally and modify the stored Flash data of the embedded device, problems such as destruction to data or a bootstrap program may also exist.

SUMMARY

The method and apparatus for erasing or writing data in a Flash memory provided in the present disclosure can set permissions for accessing a location in the Flash memory, thus preventing an illegal operation from tampering with the data in the Flash memory.

In accordance with some embodiments of the present disclosure, there is provided a method for erasing or writing data of a Flash memory. The method includes reading an instruction for erasing or writing the data, the instruction for erasing or writing the data carrying start address information and end address information of a Flash memory where an operation of the instruction is to occur. The method also includes querying whether the start address information and the end address information are in an address information table including one or more address ranges. The method further includes processing the instruction based on a result of the querying.

In accordance with some embodiments of the present disclosure, there is provided an apparatus for erasing or writing data of a Flash memory. The apparatus includes a reading unit configured to read an instruction for erasing or writing the data, the instruction for erasing or writing the data carrying start address information and end address information of a Flash memory where an operation of the instruction is to occur. The apparatus also includes a querying unit configured to query whether the start address information and the end address information are in an address information table including one or more address ranges. The apparatus further includes a processing unit configured to process the instruction based on a result of the querying by the query unit.

According to the method and apparatus for erasing or writing data of a Flash memory provided in embodiments of the present disclosure, when an operation of erasing or writing Flash data is initiated, start address information and end address information corresponding to a location in the Flash memory are carried in an erasing or writing instruction, and the start address information and the end address information are stored in an address information table. When the Flash data is to be erased and written, it is queried whether the address information of the instruction is in the address information table. When the address information in the actual operation is in the address information table, the operation of erasing or writing data is executed. Otherwise, the erasing or writing operation is not executed. Compared with the conventional art, the present disclosure can set permissions for a location in a Flash memory, thus preventing an illegal operation from tampering with the data in the Flash memory.

DETAILED DESCRIPTION

In order to illustrate the objectives, technical solutions and advantages of the embodiments of the present disclosure, the technical solutions in the embodiments of the present disclosure will be described in the following with reference to the accompanying drawings of the embodiments of the present disclosure. It is apparent that the embodiments described herein are merely some of rather than all of the embodiments of the present disclosure. Based on the embodiments described herein, all other embodiments obtained by those of ordinary skill in the art without creative efforts shall be encompassed in the protective scope of the present disclosure.

Figure 1:
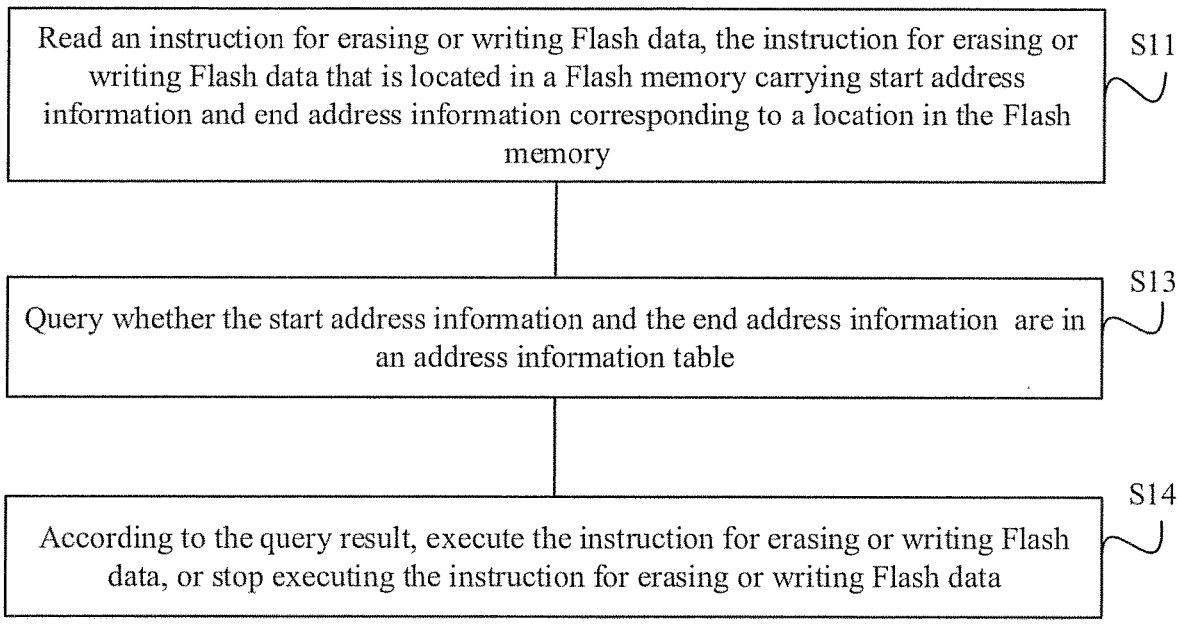
FIG. 1 is a flowchart of an exemplary method for erasing or writing Flash data according to some embodiments of the present disclosure.

The present disclosure provides an exemplary method for erasing or writing Flash data. As shown in FIG. 1, the method can include steps S11, S13, and S14.

In step S11, an instruction for erasing or writing Flash data is read. The instruction may be requested by an authorized upper-level application that provides configuration information and log information, system upgrade, or the like to the Flash memory. The instruction for erasing or writing data located in a Flash memory carries start address information and end address information corresponding to a location in the Flash memory where the operation of the instruction is to occur.

In step S13, it is queried whether the start address information and the end address information of the instruction are in an address information table. The address information table includes start address information and end address information of one or more Flash address ranges allowing erasing or writing.

In step S14, according to the query result, the instruction for erasing or writing Flash data is executed or the execution of the instruction for erasing or writing Flash data is stopped.

Optionally, the step of executing the instruction for erasing or writing data for the Flash memory or stopping the execution of the instruction for erasing or writing data in the Flash memory according to the query result includes: executing the instruction for erasing or writing Flash data when the start address information and the end address information are in the address information table; and stopping executing the instruction for erasing or writing Flash data when the start address information and the end address information are not in the address information table.

Figure 2:
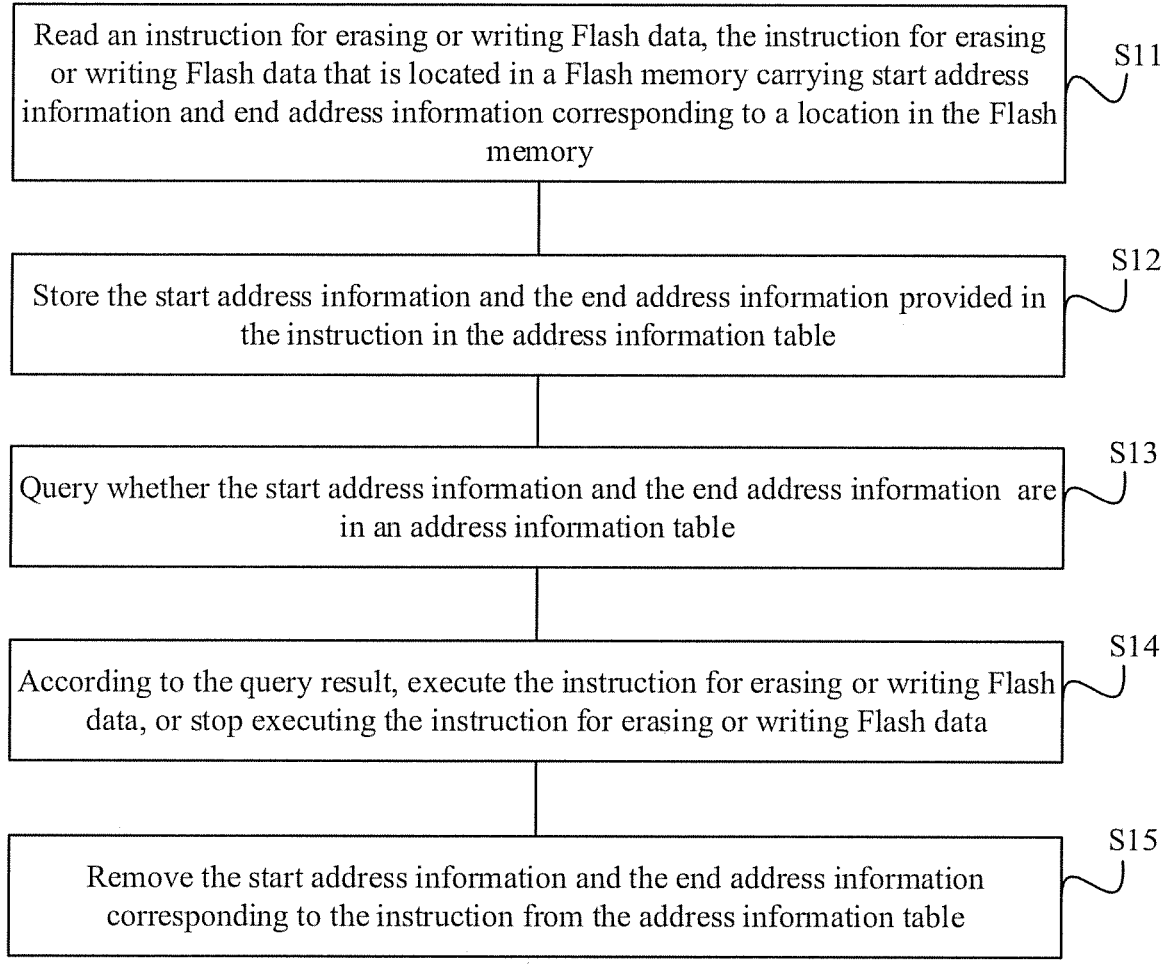
FIG. 2 is another flowchart of an exemplary method for erasing or writing Flash data according to some embodiments of the present disclosure.

Operations on a Flash memory include reading, writing, and erasing. Operations such as configuration information, log information, and system upgrade in an embedded system generally involve writing and modifying data in the Flash memory. Modifying the Flash data involves erasing the original data of the Flash memory before new data is written. When an upper-layer application needs to write or modify (erase first and then write) data in the Flash memory, the instruction request includes a start address information and an end address information of the Flash memory where the operation of the instruction is to occur is included in an instruction request. After the step of reading an instruction for erasing or writing Flash data, as shown in FIG. 2, the method can further include step S12.

In step S12, the start address information and the end address information provided in the instruction are stored in the address information table.

The method for erasing or writing Flash data provided in the present disclosure stores address range information (e.g., start address information and end address information) of a Flash memory to be operated by an upper-layer application. For example, the start address information and the end address information provided in the instruction can be stored into an address information table. The address information table allows storing multiple address ranges each having start address information and end address information. The address information in the address information table can also be added or deleted dynamically. The address information table can be as shown in the following table.

| Flash_Start_Address1 | Flash_End_Address1 |
| Flash_Start_Address2 | Flash_End_Address2 |
| Flash_Start_Address3 | Flash_End_Address3 |
| Flash_Start_Address4 | Flash_End_Address4 |
| ... | ... |
| 0 | 0 |

When attempting to erase or write data to the Flash memory, the address information table is queried to determine whether the start address information and the end address information provided in the instruction are in an address information table. If the information is in the address information table, an erasing or writing operation is executed. On the other hand, if the information is not in the address information table, it is indicated that an erasing or writing request is illegal, and the operation of erasing data or writing data is no longer executed.

While the address information table is set up as a whitelist that identifies address ranges within Flash memory that can be erased or written to, it is appreciated that the address information table could be set up as a blacklist that identifies address ranges that cannot be erased or written to. In the latter blacklist situation, upon receiving an instruction for erasing or writing data associated with an address range, the address information table could be updated to remove that address range from the list.

After the erasing or writing operation is executed, the start address information and the end address information may need to be removed. Optionally, as shown in FIG. 2, after the step of executing the instruction for erasing or writing Flash data in step S14, the method can further include step S15.

In step S15, the start address information and the end address information corresponding to the executed instruction are removed from the address information table.

For an illegal Flash operation, since the start address information and the end address information of the Flash memory that are to be written or erased are not stored in the address information table, the address information cannot be retrieved from the address information table to perform the illegal operation. Therefore, the erasing or writing operation cannot be executed on the Flash memory, and the Flash data cannot be modified, thus protecting the Flash data from being tampered with.

Figure 3:
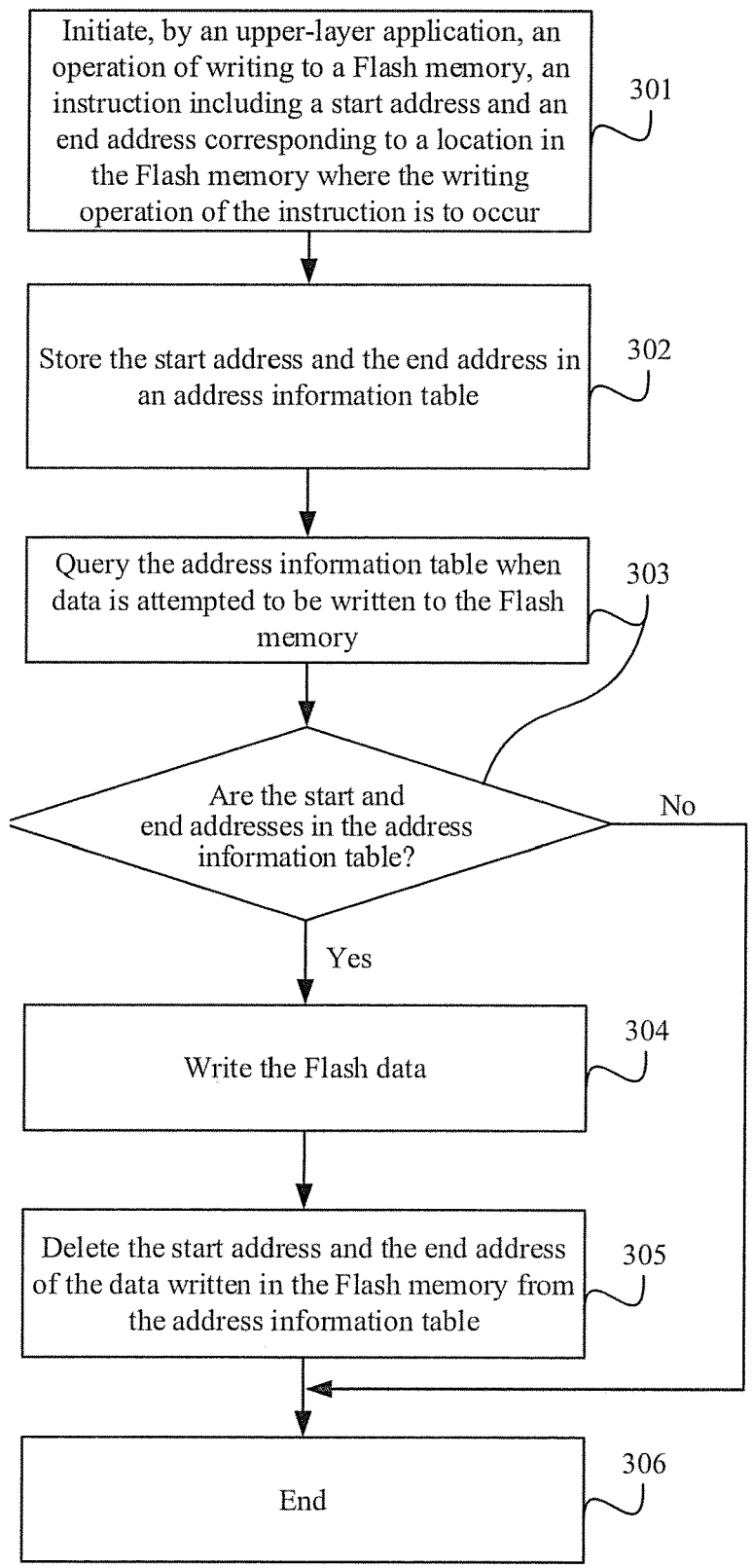
FIG. 3 is yet another flowchart of an exemplary method for erasing or writing Flash data according to some embodiments of the present disclosure.

FIG. 3 shows a flowchart of an exemplary method for performing a writing operation on a Flash memory according to some embodiments of the present disclosure. In step 301, an authorized upper-layer application initiates an operation of writing to a Flash memory, resulting in an instruction request. The instruction request includes start address information and end address information corresponding to a location in the Flash memory where the writing operation of the instruction is to occur. In step 302, the start address information and the end address information are stored in an address information table. In step 303, when Flash data is attempted to be written to the Flash memory via the instruction request, the address information table is queried to determine whether address information of the instruction request is located in the address information table. If the address information of the instruction request is not in the address information table, the operation of writing data is no longer executed (e.g., step 306).

On the other hand, if the address information of the instruction request is in the address information table, in step 304, the data is written into the location of Flash memory corresponding to the start and end address information. After the Flash data is written, in step 305, the start address and the end address of the data written in the Flash memory are deleted from the address information table.

According to the method for erasing or writing Flash data provided in the present disclosure, when an operation of erasing or writing Flash data is initiated, an erasing or writing instruction carries start address information and end address information of a Flash memory for operation. The start address information and the end address information of the Flash memory for operation are stored in an address information table. When Flash data is erased and written, it is queried whether address information used for an actual operation is in the address information table. When the address information used for the actual operation is in the address information table, the operation of erasing or writing Flash is executed. Otherwise, the erasing or writing operation is not executed. Compared with the conventional art, the present disclosure can set permissions for accessing an address of a Flash memory for operation, thus preventing an illegal operation from tampering with Flash data.

Figure 4:
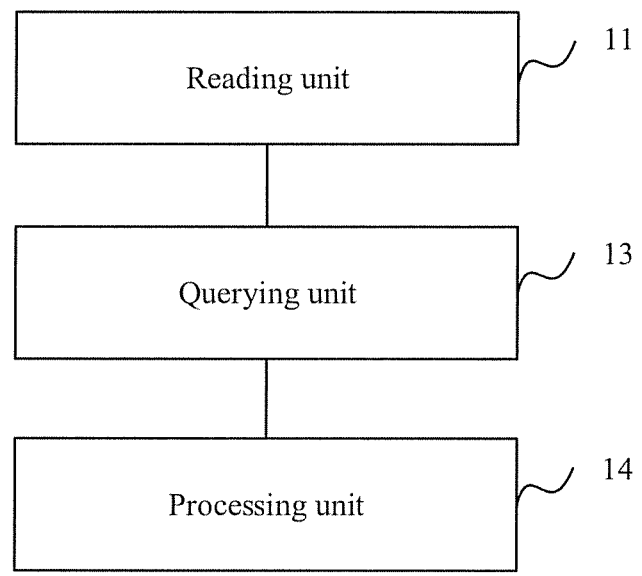
FIG. 4 is a schematic diagram of an exemplary apparatus for erasing or writing Flash data according to some embodiments of the present disclosure.

The embodiments of the present disclosure further provide an exemplary apparatus for erasing or writing Flash data. As shown in FIG. 4, the apparatus includes a reading unit 11 configured to read an instruction for erasing or writing Flash data. The instruction for erasing or writing Flash data carries start address information and end address information corresponding to a location in the Flash memory where the operation of the instruction is to occur.

The apparatus also includes a querying unit 13 configured to query whether the start address information and the end address information are in an address information table. The address information table includes one or more Flash memory address ranges including start address information and end address information for allowing erasing or writing.

The apparatus further includes a processing unit 14 configured to normally execute the instruction for erasing or writing Flash data or stop executing the instruction for erasing or writing Flash data according to the query result.

Optionally, the processing unit is configured to normally execute the instruction for erasing or writing Flash data when the start address information and the end address information are in the address information table. Optionally, the processing unit is configured to stop executing the instruction for erasing or writing Flash data when the start address information and the end address information are not in the address information table.

Figure 5:
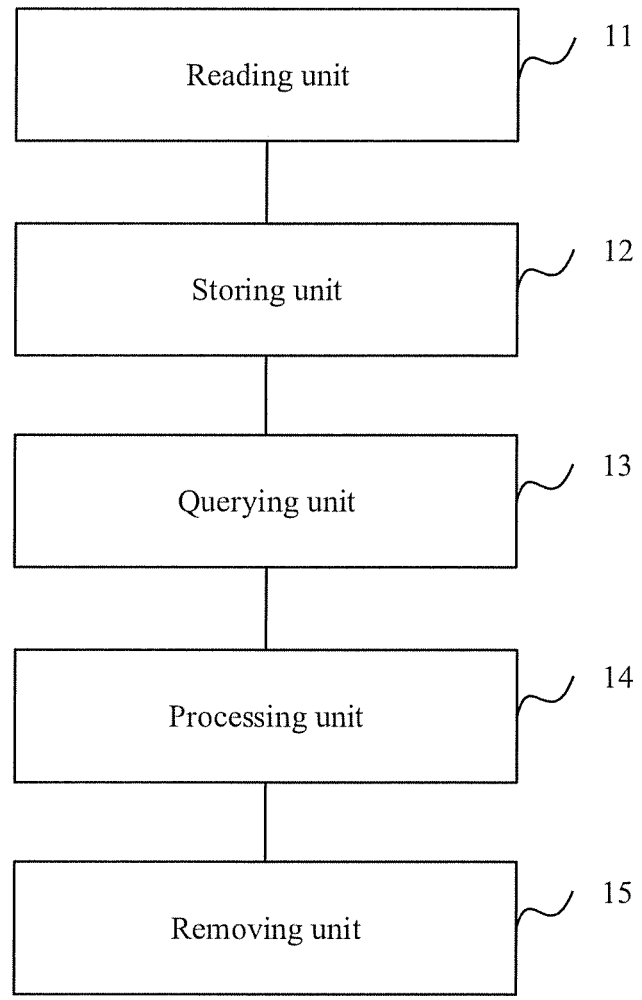
FIG. 5 is another schematic diagram of an exemplary apparatus for erasing or writing Flash data according to some embodiments of the present disclosure.

Optionally, as shown in FIG. 5, the apparatus can further include a storing unit 12 configured to, after reading unit 11 reads the instruction for erasing or writing Flash data, store in the address information table the start address information and the end address information provided in the instruction.

Optionally, as shown in FIG. 5, the apparatus can further include a removing unit 15 configured to, after processing unit 14 executes the instruction for erasing or writing Flash data, remove from the address information table the start address information and end address information.

According to the apparatus for erasing or writing Flash data provided in the present disclosure, when an operation of erasing or writing Flash data is initiated, an erasing or writing instruction carries start address information and end address information corresponding to a location in the a Flash memory where the operation of the instruction is to occur. The start address information and the end address information are stored in an address information table. When Flash data is requested to be erased and written, it is queried whether address information provided in the instruction is in the address information table. When the address information is in the address information table, the operation of erasing or writing Flash is executed. Otherwise, the erasing or writing operation is not executed. Compared with the conventional art, the present disclosure can set permissions for one or more address ranges in a Flash memory to which an operation can occur, thus preventing an illegal operation from tampering the Flash data.

Those of ordinary skill in the art can understand that all or a part of processes in the method of the foregoing embodiments can be implemented by a computer program instructing relevant hardware. The program can be stored in a computer readable storage medium. When executed, the program can include processes of the embodiments of the foregoing methods. The storage medium can be a magnetic disk, an optical disc, a Read-Only Memory (ROM), a Random Access Memory (RAM), or the like.

The above descriptions are merely specific implementation manners of the present disclosure, but the protective scope of the present disclosure is not limited to this. Variations or replacements that can be easily thought of by one of skill in the art within the technical scope disclosed in the present disclosure shall all be encompassed in the protective scope of the present disclosure. Therefore, the current protective scope of the present disclosure should be subject to the scope of the claims.

The invention claimed is:

1. A method for erasing or writing data for a Flash memory, comprising:
   reading an instruction for erasing or writing the data, the instruction for erasing or writing the data carrying start address information and end address information of the Flash memory where an operation of the instruction is to occur;
   storing the start address information and the end address information from the instruction in an address information table, wherein the address information table is associated with a permission or a prohibition for data erasing or writing in the Flash memory, and the address information table is configured to store multiple address ranges;
   in response to initiating erasing or writing data to the Flash memory according to the instruction, querying whether the start address information and the end address information are in the address information table; and
   processing the instruction based on a result of the querying.

2. The method of claim 1, wherein processing the instruction based on a result of the querying comprises executing the instruction for erasing or writing data in the Flash memory based on the result.

3. The method of claim 2, wherein executing the instruction for erasing or writing data in the Flash memory based on the result comprises:
   executing the instruction for erasing or writing data in response to the start address information and the end address information being in the address information table, the address information table being associated with the permission for data erasing or writing.

4. The method of claim 2, wherein after executing the instruction, the method further comprises:
   removing, from the address information table, the start address information and the end address information associated with the instruction.

5. The method of claim 2, wherein executing the instruction for erasing or writing data in the Flash memory based on the result comprises:
   executing the instruction for erasing or writing data in response to the start address information and the end address information not being in the address information table, the address information table being associated with the prohibition for data erasing or writing.

6. The method of claim 1, wherein processing the instruction based on a result of the querying comprises stopping executing the instruction for erasing or writing data in the Flash memory based on the result.

7. The method of claim 6, wherein stopping executing the instruction for erasing or writing data in the Flash memory based on the result further comprises:
   stopping executing the instruction for erasing or writing data in the Flash memory in response to the start address information and the end address information not being in the address information table, the address information table being associated with the permission for data erasing or writing.

8. The method of claim 1, wherein after reading the instruction for erasing or writing data in the Flash memory, the method further comprises:
updating the address information table based on the start address information and the end address information carried in the instruction.

9. The method of claim 1, wherein the instruction carrying the start address information and the end address information is associated with an operation initiated by an upper-layer application.

10. An apparatus for erasing or writing data for a Flash memory, comprising:
a reading unit configured to read an instruction for erasing or writing data, the instruction for erasing or writing data carrying start address information and end address information of a Flash memory where an operation of the instruction is to occur;
a storing unit configured to store the start address information and the end address information from the instruction in an address information table, wherein the address information table is associated with a permission or a prohibition for data erasing or writing in the Flash memory, and the address information table is configured to store multiple address ranges;
a querying unit configured to query whether the start address information and the end address information are in the address information table in response to erasing or writing data to the Flash memory according to the instruction being initiated; and
a processing unit configured to process the instruction based on a result of the querying by the query unit.

11. The apparatus of claim 10, wherein the processing unit is further configured to execute the instruction for erasing or writing data in the Flash memory based on the result.

12. The apparatus of claim 11, wherein the processing unit is further configured to execute the instruction for erasing or writing data in response to the start address information and the end address information being in the address information table, the address information table being associated with the permission for data erasing or writing.

13. The apparatus of claim 11, wherein the processing unit is further configured to, after executing the instruction, remove, from the address information table, the start address information and the end address information associated with the instruction.

14. The apparatus of claim 11, wherein the processing unit is further configured to execute the instruction for erasing or writing data in response to the start address information and the end address information not being in the address information table, the address information table being associated with the prohibition for data erasing or writing.

15. The apparatus of claim 10, wherein the processing unit is further configured to stop executing the instruction for erasing or writing data in the Flash memory based on the result.

16. The apparatus of claim 15, wherein the processing unit is further configured to stop executing the instruction for erasing or writing data in the Flash memory when the start address information and the end address information are not in the address information table, the address information table being associated with the permission for data erasing or writing.

17. The apparatus of claim 10, wherein the apparatus is further configured to update the address information table based on the start address information and the end address information carried in the instruction.

18. The apparatus of claim 10, wherein the instruction carrying the start address information and the end address information is associated with an operation initiated by an upper-layer application.

* * * * *